Nov. 18, 1969   H. H. GROOS   3,478,562
INDUCTIVELY HEATED BILLET-CONTAINERS FOR EXTRUSION PRESSES
Filed June 9, 1967   2 Sheets-Sheet 1

3,478,562
INDUCTIVELY HEATED BILLET-CONTAINERS FOR EXTRUSION PRESSES
Horst Hans Groos, Metzkausen, Germany, assignor to Schloemann Aktiengesellschaft, Dusseldorf, Germany, a corporation of Germany
Filed June 9, 1967, Ser. No. 644,865
Claims priority, application Germany, June 15, 1966, Sch 39,125
Int. Cl. B21c 29/02
U.S. Cl. 72—272                                   5 Claims

ABSTRACT OF THE DISCLOSURE

An inductively heated billet-container for extrusion presses, with longitudinal bores accommodating bar-shaped conductors forming an induction coil, with material that does not conduct the magnetic field of force interposed between the conductors and the walls of the bores, the cross-sectional area of the said non-magnetic material being greater in the central part of the container than towards its ends.

---

This invention relates to the heating of the billet-containers of extrusion presses, and keeping them hot, by means of eddy currents. As is known, the billet-containers of extrusion presses must be heated in order that the billets placed in them to be extruded may not undergo any cooling by the container walls. This applies in a special measure to the extrusion of billets of light metal, since here the extrusion time is considerably longer than with billets of heavy metal. Light metal, as is known, for the maintenance of the necessary extrusion temperature during the slower extrusion operation, needs more heat, and this it receives from the container walls.

The greater the output of a press, the longer are the billet-containers, and therefore the billets to be extruded, and the longer does the actual extrusion time last.

In order to be able to withstand these high extrusion pressures, which may reach 100 kgs. per square mm. and more, at these high temperatures, it is usual to employ receivers which consists of an inner sleeve, one or more intermediate sleeves, and an outer jacket, which are shrunk on to one another. In this way are produced correspondingly high compressive and tensile stresses in the cross-sections of the sleeves and jacket, for taking up the high extrusion pressure. The jacket of the billet-container has frequently been made, particularly on technical production grounds, from a plurality of rings located side by side.

In the heating of the billet-container it is very important to take care that the temperature over the length of the billet-container is fairly uniform. With a uniform heating of the billet-container jacket, for instance by means of electrical heating elements lodged in longitudinal or radial bores, the temperature is highest in the middle region of the container, and falls towards the ends. Consequently there is a great risk that in the central region of the billet-container, owing to excessive temperatures, the initial stresses, which were produced on the bais of the shrinkage connection, and which were important for taking up the extrusion force, may weaken. Consequently the central region of the container, during the extrusion of the billet, may belly out like a barrel and acquire a permanent deformation. In this event, in subsequent extrusion operations, extrusion material would be vary liable to flow backwards along the press ram between the pressure plate and the container wall.

By employing resistance heating elements, which can be inserted and assembled into groups, in axial or radial bores in the jacket of the billet-container, this disadvantage of the unequal heating can indeed be conpensated for. Resistance heating, however, although it permits good adjustability, is substantially more sensitive than inductive heating, for high temperatures for example.

In the case of hitherto known constructions for the inductive heating of the billet-containers of extrusion presses, a primary coil is provided, which consists of a number of copper bars connected in series, which are located in longitudinal bores arranged concentrically around the axis of the billet-container and are insulated from the containers. These bars are connected with one another by lugs at the opposite ends of the container alternately. Any local regulating of the heating of the container to avoid the aforementioned disadvantages, has however not hitherto been possible.

The object of the present invention is to provide inductive heating of the billet-container in which the central region of the container is less heated than the parts towards the ends.

This object is attained, according to the invention, by the feature that in the case of an inductively heated billet-container for extrusion presses the jacket of which is constructed in one or more parts and is provided with longitudinal bores for the accommodation of the bar-shaped conductors forming the induction coil, the cross-sectional area of material not conducting the magnetic field of force, between the walls of the longitudinal bores and the conductors, is greater in the central region of the container jacket than towards its ends.

Hence, owing to the greater cross-sectional area, provided in the central region of the container, of material which does not transmit the magnetic field of force, the result is obtained that the heating of the container jacket is less, on the ground of the greater distance from the surface of the inducing conductor, and of the consequently lower intensity of the magnetic field.

In developing the invention, with a uniform diameter of the bar-shaped conductors forming the induction coil, the longitudinal bore of the container jacket may be of a greater diameter in the central region than towards the ends. Jackets of large dimensions, as already mentioned, are on technical manufacturing grounds, made in a plurality of co-axial parts, for instance in three parts. Thus the central ring according to the invention is given a larger bore than the rings located towards the ends. In these bores are arranged the bar-shaped conductors, of uniform diameter over their length, with a sheathing of an insulating material.

Another possibility of the adoption of the invention consists in the feature that with longitudinal bores of uniform diameter in the container jacket the bar-shaped conductors are of a smaller diameter in the central region than towards the ends of the container.

In an advantageous further development of the invention, with longitudinal bores of uniform diameter in the container jacket, bar-shaped conductors of uniform diameter throughout their length are provided in their central region with a sleeve of a material that does not conduct the magnetic field, and, in conjunction therewith, towards each end, with a sleeve which does conduct the magnetic field, the sleeve of the non-conducting material and those of the conducting material all being of the same external and internal diameters.

In a further development of the invention, with a uniform diameter throughout their length of jacket bore and bar-shaped conductors, the sleeves of conducting and non-conducting material fitted upon the conductors may be varied in such a way that by this means, just as in the aforementioned constructions, in a simple and advantageous manner, a regulating of the inductive heating with billet-containers is obtained, and by this means an influencing of the variation of temperature along the container, particularly at the endangered places.

One embodiment of the invention is illustrated in FIGURES 1 to 5 of the accompanying drawings, in which.

Figure 1:
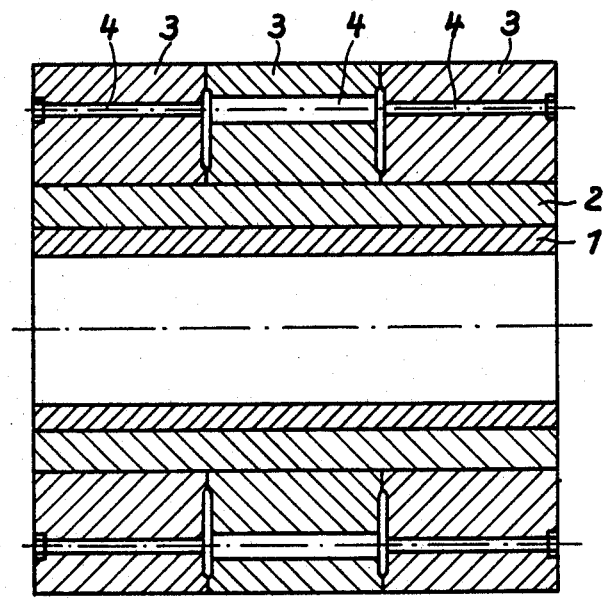
FIGURE 1 shows a billet-container in longitudinal section, with one of the longitudinal bores.
Figure 2:
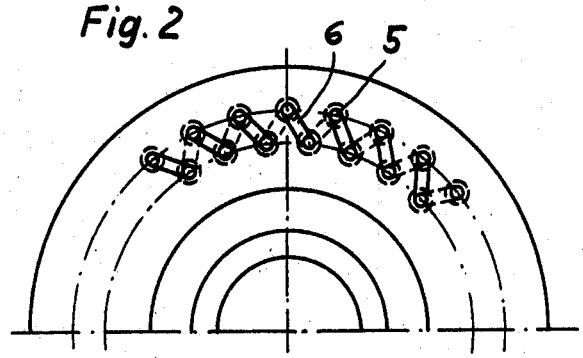
FIGURE 2 shows an end view of a billet-container.

On to the inner sleeve 1 is shrunk an intermediate sleeve 2, and on to this is then shrunk in its turn the container jacket, consisting of a central ring and two end rings all marked 3. Bar-shaped conductors 5 located in longitudinal bores 4 in the container jacket are connected to an induction coil by lugs 6 at opposite ends of the container jacket alternately.

Figure 3:
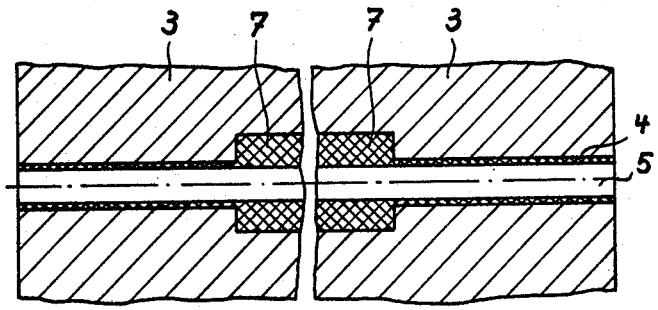
FIGURES 3 to 5 illustrate various possible forms of construction of container bores and conductors of an induction coil in a one-part container jacket.

In FIGURE 3 is shown, in the container jacket 3, a longitudinal bore 4 which is larger in the central region of the jacket than towards the ends. In this bore is arranged a bar-shaped conductor 5 of the same diameter throughout its length, surrounded by an insulating body 7.

Figure 4:
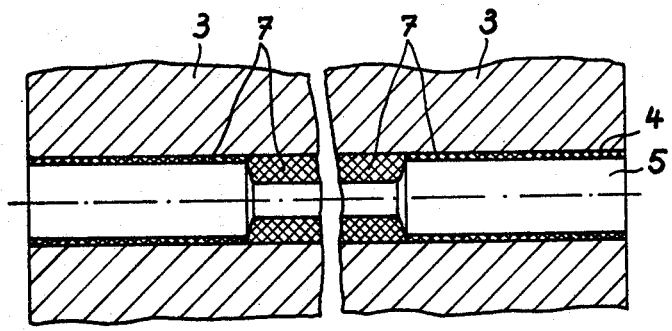

FIGURE 4 shows the container jacket 3 with a longitudinal bore 4 of uniform diameter, in which is located a bar-shaped conductor 5, which is of a smaller diameter in the central region than towards the ends, and which is also surrounded in its turn by an insulating body 7.

Figure 5:
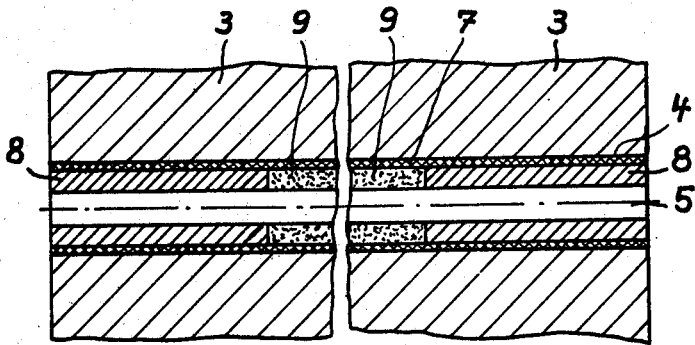

Finally FIGURE 5 shows the container jacket 3, with a longitudinal bore 4 of uniform diameter, and a bar-shaped conductor 5, also of uniform diameter throughout its length, upon each of the two ends of which is arranged a sleeve 8 of a material conducting the magnetic field, and, in the central region a sleeve 9 of a material that does not conduct the magnetic field, these sleeves together being surrounded by an insulating body 7.

I claim:

1. An inductively heated billet-container for extrusion presses, formed with longitudinal bores, and comprising: bar-shaped conductors lodged in the said bores and connected together to form an induction coil, and material that does not conduct the magnetic field of force interposed between the said conductors and the walls of the said bores, the said non-magnetic material being of greater cross-sectional area around the middle of the container than towards its ends.

2. An inductively heated billet-container as claimed in claim 1, the bar-shaped conductors that form the induction coil being of uniform diameter throughout, whereas the longitudinal bores are of greater diameter in the middle of the container than towards its ends.

3. An inductively heated billet-container as claimed in claim 1, the longitudinal bores being of uniform diameter throughout, whereas the bar-shaped conductors are of smaller diameter in the middle of the container than towards its ends.

4. An inductively heated billet-container as claimed in claim 1, the longitudinal bores being of uniform diameter throughout, the bar-shaped conductors being of uniform diameter throughout, and the non-magnetic material interposed between the conductors and the walls of the bores being in the form of axially aligned sleeves, lining the end portions of the bores, and the container further comprising sleeve of material that conducts the magnetic field lining the central portion of the bore, all these sleeves being of the same internal diameter and of the same external diameter.

5. An internally heated billet-container for extrusion presses, comprising: a multi-part jacket consisting of coaxial rings formed with longitudinal bores, bar-shaped conductors lodged in the said bores and connected together to form an induction coil, the bores in the central rings of the jacket being of greater diameter than those in the rings towards the ends of the container, and material that does not conduct the magnetic field of force interposed in the longitudinal bores between the conductors and the walls of the bores.

References Cited

UNITED STATES PATENTS 3,161,756   12/1964   Haverkamp et al. ___ 72—342 X

FOREIGN PATENTS 497,458   12/1950   Belgium.
855,479   5/1940   France.
747,477   4/1956   Great Britain.
992,794   5/1965   Great Britain.

CHARLES W. LANHAM, Primary Examiner

ANDREW LEE HAVIS, Assistant Examiner

U.S. Cl. X.R.
72—342; 219—10.49